No. 697,394. Patented Apr. 8, 1902.
S. BENSON.
NUT LOCK.
(Application filed Oct. 10, 1901.)
(No Model.)
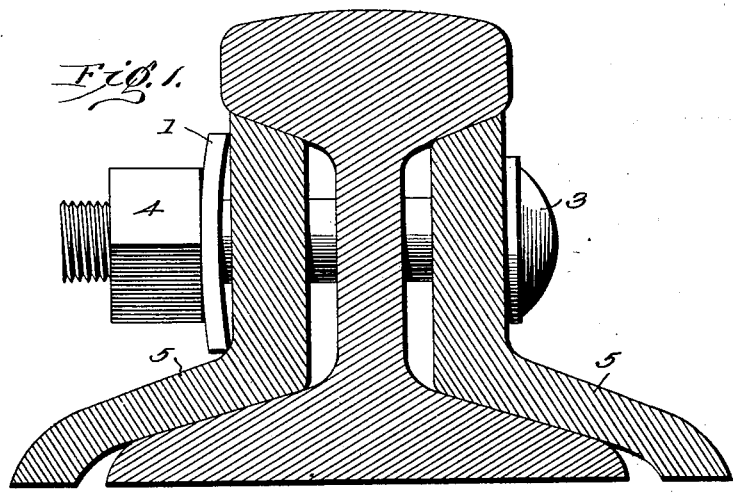
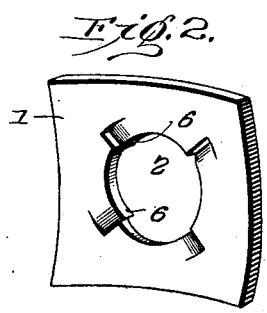
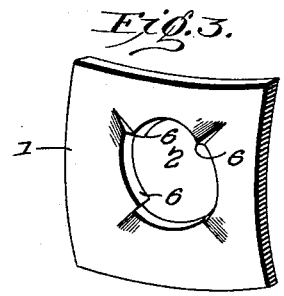
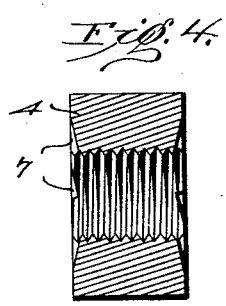
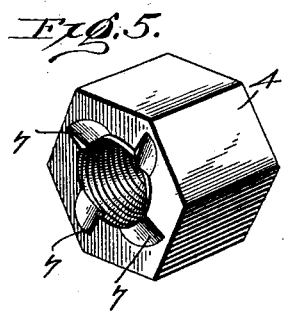
Witnesses
Sivert Benson, Inventor
by C. A. Snow & Co
Attorneys

UNITED STATES PATENT OFFICE.

SIVERT BENSON, OF SPRINGVALLEY, MINNESOTA.

NUT-LOCK.

SPECIFICATION forming part of Letters Patent No. 697,394, dated April 8, 1902.

Application filed October 10, 1901. Serial No. 78,253. (No model.)

*To all whom it may concern:*

Be it known that I, SIVERT BENSON, a citizen of the United States, residing at Springvalley, in the county of Fillmore and State of Minnesota, have invented a new and useful Nut-Lock, of which the following is a specification.

The invention relates to improvements in nut-locks.

The object of the present invention is to improve the construction of nut-locks and to provide a simple, inexpensive, and efficient device designed for use on rail-joints and other parts subject to vibration and capable of securely locking a nut from accidental rotation, whereby the nut is effectually prevented from being unscrewed by the vibration of rails or other parts to which the device may be applied.

A further object of the invention is to provide a device of this character which will be capable of contraction and expansion and which may be made of either light or heavy material to adapt it for the character of work to which it is to be applied.

The invention also has for its object to provide a nut-lock adapted to engage either a smooth nut or one provided at intervals with shoulders to interlock with it.

The invention consists in the construction and novel combination and arrangement of parts hereinafter fully described, illustrated in the accompanying drawings, and pointed out in the claim hereto appended.

In the drawings, Figure 1 is a vertical sectional view of a rail-joint provided with a nut-lock constructed in accordance with this invention. Fig. 2 is a detail view of the locking plate or washer, showing the concaved face thereof. Fig. 3 is a similar view showing the outer convex engaging face. Figs. 4 and 5 are detail views of the nut.

Like numerals of reference designate corresponding parts in all the figures of the drawings.

1 designates a locking plate or washer constructed of spring-steel or other suitable resilient material and provided with a central bolt-opening 2 and adapted to be arranged on a bolt 3 between a nut 4 and a fish-plate 5 or other part and capable of engaging the said nut and of effectually preventing the same from accidentally rotating and accidentally unscrewing when the rail-joint is subjected to the jar and vibration incident to the passage of a train. The locking plate or washer, which is curved, presents an outer convex face and has an inner concave face, and it is provided at its outer convex face with a series of projections or teeth 6, formed by upsetting the metal, preferably by punching the locking plate or washer from the inner or concave face. The locking plate or washer, which may be stamped or punched into the form shown in Figs. 2 and 3, may be made either heavy or light to adapt it for use on different constructions, such as rail-joints, bridges, machinery, and the like. The punching or stamping of the washer adjacent to the central bolt-opening forms recesses or indentations at the inner face of the locking plate or washer, and the teeth or raised portions at the outer face of the washer have shoulders and present inclined faces. The inclined faces are adapted to permit a nut to be readily screwed on the bolt to the desired extent, and when the nut is screwed against the locking plate or washer it will pass readily over the inclined faces of the teeth, and the washer may be compressed to a greater or less extent. The compression of the locking plate or washer causes the latter to firmly engage the nut, and the teeth are adapted to be partially embedded in the nut, which is constructed of softer material than the locking plate or washer. In this manner the nut will be effectually prevented from accidentally unscrewing, but may be readily removed by a wrench or other tool when the necessary power is applied.

The punching or stamping of the locking plate or washer does not produce any projections at the inner face of the same, as clearly shown in Fig. 1, and the teeth at the outer face of the said plate or washer do not interfere with the contraction or depression and the expansion of the same. The lower edge of the locking plate or washer is adapted to fit against the lower portion of the fish-plate, as shown in Fig. 1, to prevent it from accidentally rotating. This arrangement effectually locks the plate or washer against movement; but any other means may be employed for this purpose.

The locking plate or washer is adapted to engage a smooth nut or a nut constructed as illustrated in the accompanying drawings. The nut 4 is provided at its inner and outer faces with a series of recesses 7, conforming to the general configuration of the teeth 6 and providing shoulders adapted to be engaged by the same. The indentations are provided at both of the end faces of the nut in order that the latter may be reversed when one set has become worn.

The locking plate or washer is formed by means of suitable dies, which partially sever the metal of the plate in forming the projecting teeth, which are connected at their abrupt edges or shoulders with the adjacent portion of the plate or washer by a thin integral portion, which permits the necessary spring of the teeth and which also prevents the same from being forced backward into the original position occupied by the metal before the same was upset. The locking plate or washer by having the teeth connected with the adjacent portion of the plate or washer in this manner has its strength greatly increased, it being much stronger than it would be were the teeth entirely severed along the line of their abrupt edges or shoulders, and this construction also permits the use of heavier material for washers and is cheaper and more easily made.

It will be seen that the nut-lock is exceedingly simple and inexpensive in construction, that it is adapted to be readily constructed of either light or heavy material, and that it is capable of effectually preventing a nut from accidentally unscrewing. It will also be clear that the plate or washer is adapted to engage either a smooth nut or one provided with shoulders. It will also be apparent that the short indentations or recesses at the inner face of the washer or plate terminate about midway between the bolt-opening and the outer edge of the said plate or washer and that an unbroken outer portion is provided whereby the plate or washer is capable of expanding or contracting without liability of splitting or breaking.

What I claim is—

A nut-locking washer consisting of a concave resilient plate having a bolt-hole and adjacent thereto a series of indentations in its inner face, whereby the metal of the washer is upset forming projecting teeth, said teeth terminating short of the edges of the washer, as set forth.

In testimony that I claim the foregoing as my own I have hereto affixed my signature in the presence of two witnesses.

SIVERT BENSON.

Witnesses:
R. C. LIVINGSTON,
W. L. KELLOGG.